United States Patent
Luca

(10) Patent No.: US 7,055,319 B1
(45) Date of Patent: Jun. 6, 2006

(54) PISTON AND CYLINDER ASSEMBLY WITH VOLUME COMPENSATING SYSTEM

(76) Inventor: Valentin Luca, 1157 Melville Ave., Fairfield, CT (US) 06825

( * ) Notice: Subject to any disclaimer, the term of this patent is extended or adjusted under 35 U.S.C. 154(b) by 7 days.

(21) Appl. No.: 10/928,813

(22) Filed: Aug. 27, 2004

(51) Int. Cl.
*B60G 11/56* (2006.01)

(52) U.S. Cl. .......................... 60/475; 92/85 B; 92/134

(58) Field of Classification Search ............... 92/85 B, 92/131, 134, 135; 60/475; 188/201, 202, 188/267, 314, 315; 267/33, 35
See application file for complete search history.

(56) References Cited

U.S. PATENT DOCUMENTS

| | | | | |
|---|---|---|---|---|
| 3,439,913 A | * | 4/1969 | Kamman | 188/287 |
| 3,487,494 A | * | 1/1970 | Baan et al. | 16/51 |
| 3,625,321 A | * | 12/1971 | Lutz | 188/315 |
| 3,837,444 A | * | 9/1974 | Allinquant et al. | 188/315 |
| 3,853,311 A | * | 12/1974 | Kreuzer et al. | 188/288 |
| 5,172,794 A | * | 12/1992 | Ward | 188/282.8 |
| 5,353,897 A | * | 10/1994 | Woessner | 188/267 |
| 5,477,947 A | * | 12/1995 | Schalles et al. | 188/314 |
| 5,878,851 A | * | 3/1999 | Carlson et al. | 188/267 |
| 6,095,486 A | * | 8/2000 | Ivers et al. | 188/267 |

* cited by examiner

*Primary Examiner*—Edward K. Look
*Assistant Examiner*—Michael Leslie
(74) *Attorney, Agent, or Firm*—Fattibene & Fattibene; Arthur T. Fattibene; Paul A. Fattibene

(57) ABSTRACT

A piston and cylinder assembly having a cylinder with a piston and a connected piston rod. The piston defines opposed chambers wherein a compensating device is disposed in at least one of the chambers. The compensating device includes a capsule of an elastic material containing a gaseous medium which is compressed comparable to the volume displaced by the piston rod when fully retracted. When the piston rod is in its protracted position, the compensating capsule expands so that the pressure within the hydraulic chamber of the cylinder reaches a value that will minimize the absorption of any air into the cylinder and not overload the bearing seal through which the piston rod extends.

11 Claims, 6 Drawing Sheets

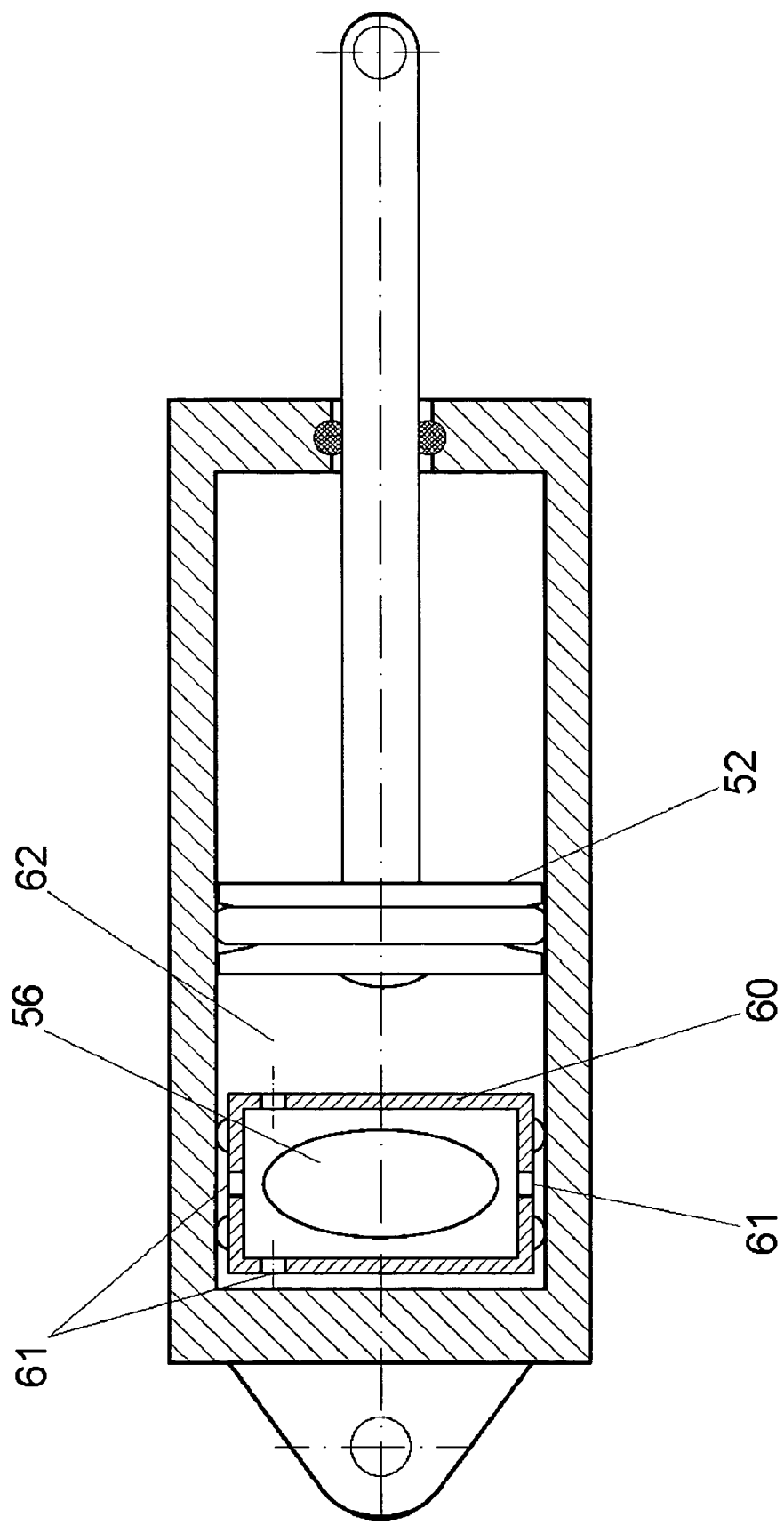

PISTON AND CYLINDER ASSEMBLY WITH VOLUME COMPENSATING SYSTEM

FIELD OF INVENTION

This invention is generally directed to a piston and cylinder assembly, and more specifically to a piston and cylinder assembly having an internal volume compensating system for compensating for any loss of fluid volume.

BACKGROUND OF THE INVENTION

The operation of closed hydraulic piston and cylinder assemblies and the problems encountered to compensate for volume displaced by the reciprocation of the piston and piston rod during the operation of the piston and cylinder assembly have been widely known and experienced in the art; and numerous efforts have been made to obviate such noted problems. However, the known efforts to alleviate the noted problems have not always been simple to apply for a particular application, e.g. where it is desirable that air or gas be strictly prohibited from being introduced into the cylinder. One such application is where the incompressibility of the liquid or hydraulic fluid in one of the closed cylinder chambers is used to hold the piston firmly in a given operative position thereof. In any such application, the presence of any air or gas introduced into the cylinder chambers or within the hydraulic fluid would render the use of such piston and cylinder assembly inoperative of any such application.

SUMMARY OF THE INVENTION

An object of this invention is to provide a compensating system for use in a hydraulic piston and cylinder assembly that is effective to prohibit the aspiration of any air or gas into the cylinder of the assembly.

Another object of the invention is to provide a compensation system capable of localizing the compensation to a particular chamber of a hydraulic cylinder.

Another object of the invention is to provide a compensation system for use in a hydraulic piston and cylinder assembly that is relatively simple, easy to fabricate and can be readily adapted to and/or retrofitted for use in any closed piston and cylinder assembly.

The foregoing objects and other features and advantages, as will be apparent to those skilled in the art, are attained by a piston and cylinder assembly that generally includes a cylinder having a piston and a connected piston rod reciprocally disposed within the cylinder. The free end of the piston rod is extended through an end wall of a cylinder so that the piston is reciprocated as the piston rod is extended and retracted and causing the displaced hydraulic fluid to flow from one chamber to the other when a force is applied to the piston rod. In accordance with this invention, a compensating system is provided in one or the other of the cylinder chambers.

The compensating system includes a compensating capsule that contains a gaseous medium which is compressed by a volume comparable to the volume displaced by the piston rod when fully retracted within the cylinder. Subsequently, when the piston rod is extended to its protracted position, the compensating capsule expands so that when the piston rod is completely extended, the pressure within the hydraulic chamber reaches a value that minimizes the absorption of any air into the cylinder and which will not overload the bearing seal through which the piston rod extends when the piston rod is fully retracted.

IN THE DRAWINGS

FIG. 6 is a sectional view of a piston and cylinder assembly embodiment of still another form of the invention.

DETAIL DESCRIPTION

Figure 1:
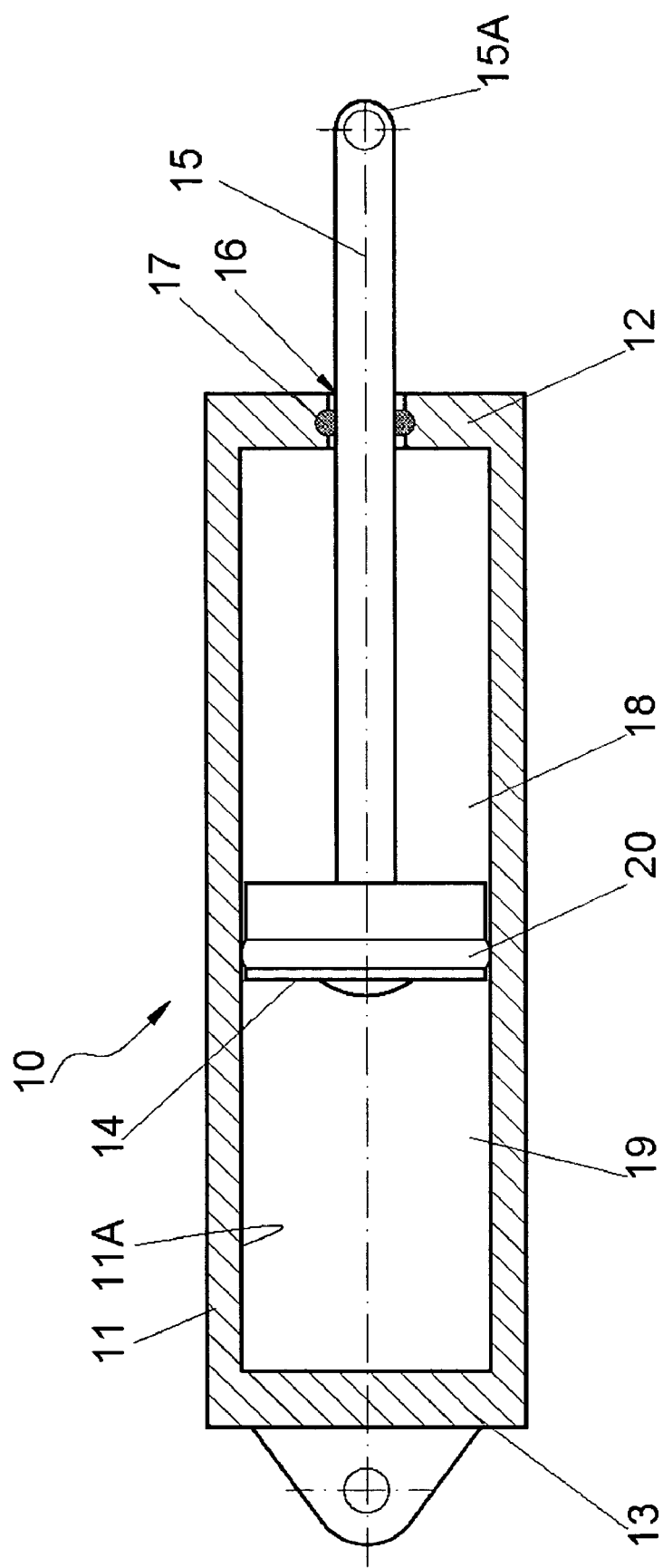
FIG. 1 is a sectional view of a typical prior art cylinder and piston assembly.

Referring to the drawings, FIG. 1 illustrates the conventional type of a hydraulic piston and cylinder assembly 10 which generally comprise a closed cylinder 11 having opposed end walls 12 and 13. Reciprocally disposed within the cylinder 11 is a piston 14 and connected piston rod 15. The free end 15A of the piston rod 15 extends through an opening 16 formed in the cylinder end wall 12. A suitable seal or packing 17 is provided to form a fluid tight seal about the piston rod and the opening 16 so as to prohibit any loss of the actuating fluid within the cylinder 11. As shown, the reciprocating piston 14 defines within the cylinder 11 two opposed chambers 18 and 19 which alternately expand and contract as the piston reciprocates within the cylinder 11.

Circumscribing the piston 14 is a suitable sealing member, e.g. an 0-ring 20 or the like, to form a sliding seal between the periphery of the piston 14 and the internal surface 11A of the cylinder 11. It will be understood that the piston and cylinder assembly 10 is provided with suitable means to provide a passageway whereby the displaced actuating fluid in chamber 18 is permitted to flow into chamber 19 and vice versa, as the piston and its associated piston rod is reciprocated within the cylinder. Such passageways to permit the flow of displaced fluid medium from one chamber to the other as the piston reciprocates, may be located either internally of the cylinder or externally thereof. Reference is made to my co-pending patent application Ser. No. 10/807,021 filed Mar. 23, 2004, which refers to the use of internal or external means to control the flow of the fluid medium from one chamber to the other as the piston reciprocates and which application is incorporated hereby by reference.

Figure 2:
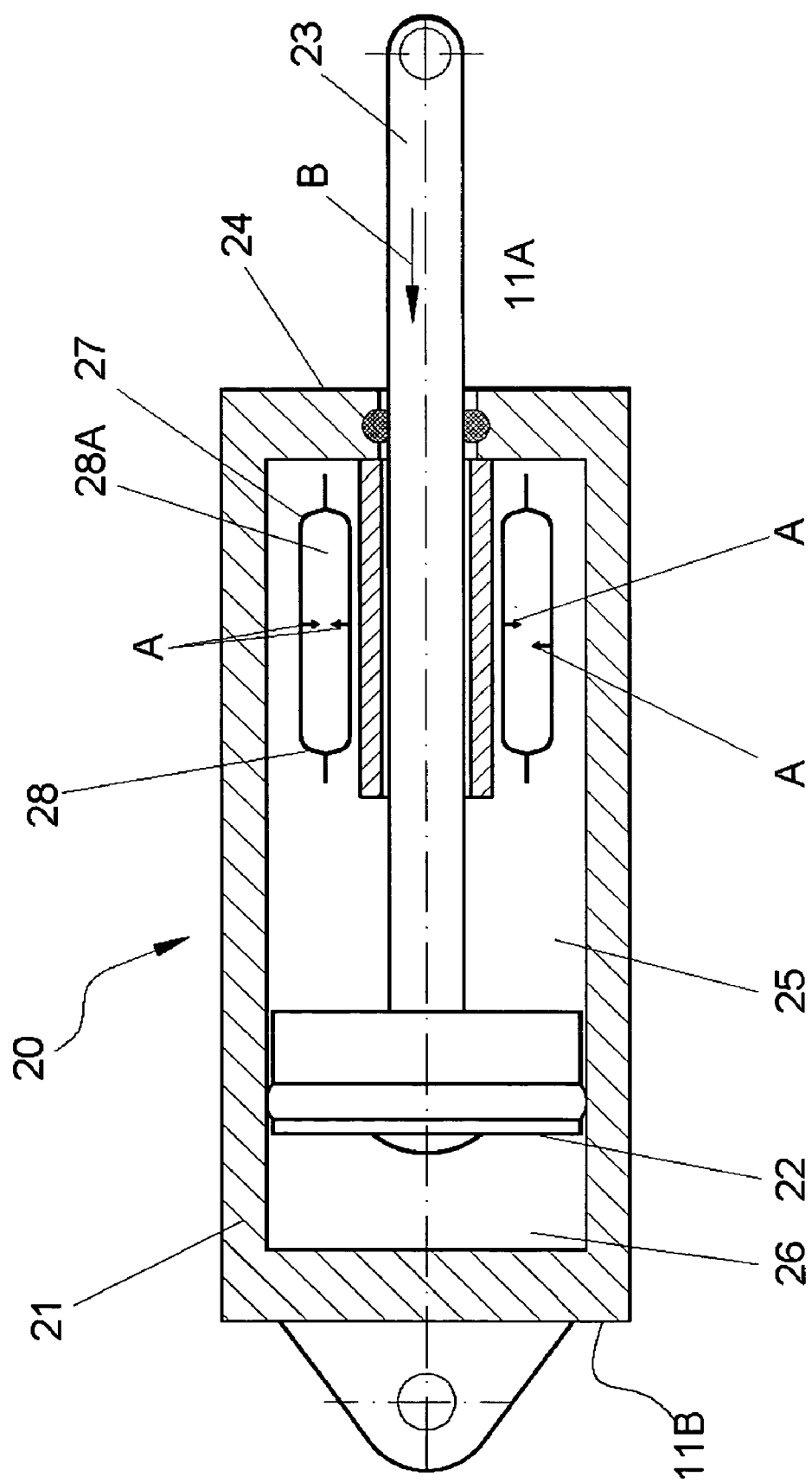
FIG. 2 is a sectional view of a piston and cylinder embodying the instant invention.

FIG. 2 is directed to a piston and cylinder assembly 20 which embodies a compensating means in accordance with the present invention. As shown, the piston and cylinder assembly 20 includes a closed cylinder 21 with a reciprocating piston 22 and connected piston rod 23 similar to that of FIG. 1. The free end of the piston rod 23 is extended through one end wall 24 of the cylinder 21, and the piston defines opposed expandable chambers 25 and 26 within the cylinder 21. As the piston rod 23 extends through chamber 25, for purposes of description, chamber 25 may be defined as the rod side chamber.

In accordance with this invention, a compensator means is disposed within the cylinder. In the embodiment of FIG. 2, the compensator means 27 is disposed in the rod side chamber 25. While the compensator means may be formed in various shapes, the compensator means 27 is illustrated in FIG. 2 as a toroidal or donut shaped capsule 28 having a central opening sized to receive the piston rod 23. The body of the capsule 28 is formed of an elastic or expandable gas impervious material that defines a closed chamber 28A for containing a gaseous fluid in a compressed state. The gas that is confined within the capsules 28 is selected so as to not react with the material that defines the body of the capsule 28. In the illustrated embodiment of FIG. 2, a limiting bushing 29 is disposed about the piston rod 23 which may also function as a means of limiting the piston travel to control the extended stroke of the piston.

As shown, the toroidal capsule 28 circumscribes bushing 29. The arrangement and construction of the compensating capsule 28 is such that the gas in the capsule 28 compresses on the retracting stroke of the piston rod 23 and expands on the extending or protracting stroke of the piston rod 24. The compression of the gas within the capsule 28 is illustrated by arrows A as the piston rod is being retracted in the direction of arrow B, and reversed as the piston rod is extended.

With the piston rod 23 completely retracted within cylinder 21, the gas confined within the compensator body or capsule 28 is compressed while assembling the cylinder. Subsequently, when the piston rod 23 is extended, the gas in the capsule 28 expands, and in doing so, it maintains the average pressure on the seal at substantially ambient atmospheric pressure, thus preventing the absorption of air into the cylinder through the bearing or seal 23A, through which the piston rod 23 extends.

Figure 3:
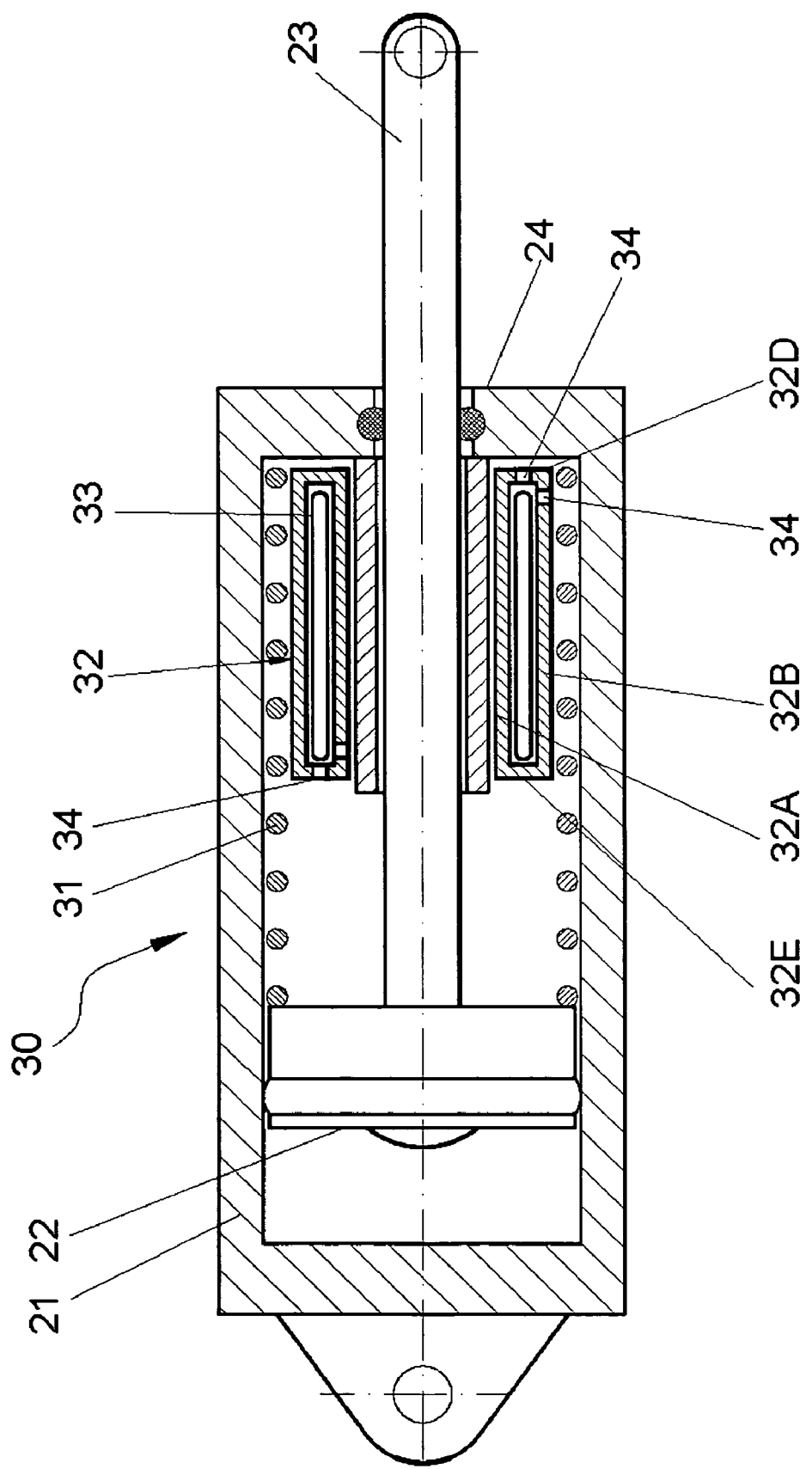
FIG. 3 is a sectional view of a piston and cylinder assembly embodying a modified form of the invention.

FIG. 3 is directed to a modified form of the invention. As shown in FIG. 3, the piston and cylinder 30 is similar to that describe with respect to the assembly 20 of FIG. 2. However, the form of the invention disclosed in FIG. 3 differs in that a spring 31 is disposed between the piston 22 and the end wall 24 of the cylinder 21. The embodiment disclosed in FIG. 3 also differs from that of FIG. 2 in that the compensator means includes protective, rigid housing 32 in which the compensating capsule 33 is housed. In this form of the invention, the structure and operation of the compensating capsule 33 is similar to capsule 28 of FIG. 2.

The protective housing 32 is defined by spaced apart inner and outer circumscribing walls 32A, 32B respectively, which are connected by opposed end walls 32D and 32E. The inner wall is sized so as to receive the piston rod 23. In this form of the invention, the housing is provided with openings or holes 34 so as to place the interior of the housing 32 in communication with the medium or hydraulic fluid disposed within the cylinder 21. It will be understood that the holes 34 may be provided in one or more walls 32A–32D that form the housing 32 so that the hydraulic fluid can freely circulate through the housing 32 to permit the compensating capsule 33 to sense any change in volume of the hydraulic fluid to cause the capsule to expand or contract accordingly, as the result of the movement piston rod 23. The protective housing 32 also provides a limitation means for controlling the maximum extended position of the piston rod 23, and also functions as a protector for the elastic body or capsule 33 against wear or damage that may result from any direct contact with the piston rod 23 or other elements of the assembly, such as the spring 31 of the assembly 30. In all other respects, the structure and operation of the embodiment of FIG. 3 is similar to that described with respect to the embodiment of FIG. 2.

Figure 4:
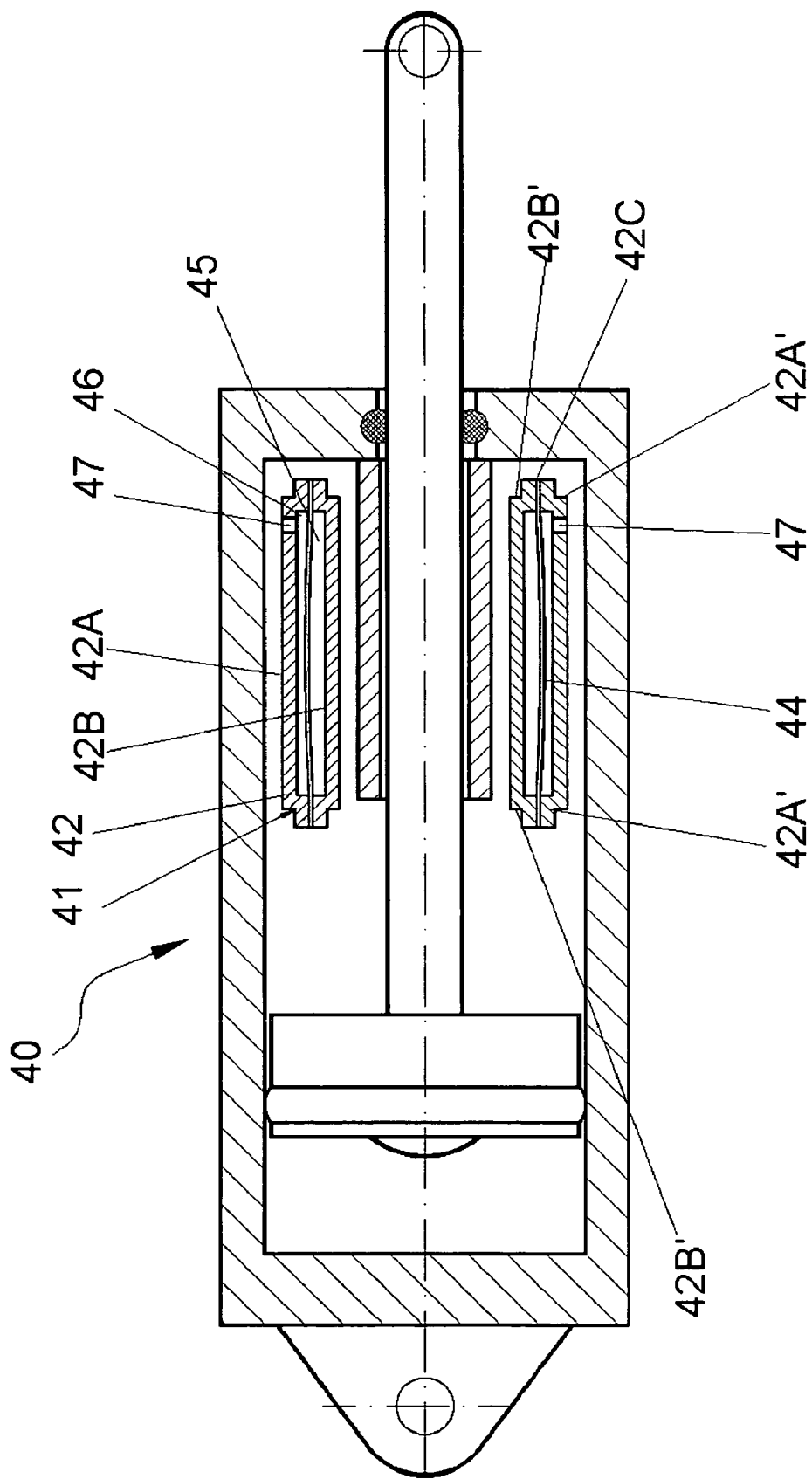
FIG. 4 is a sectional view of a piston and cylinder embodying another modified form of the invention.

FIG. 4 is directed to another modified embodiment of the invention. The embodiment disclosed in FIG. 4 differs from embodiments hereinbefore described in that the compensator means comprises a protective housing which is integrated with the compensating means. As shown, the embodiment of FIG. 4 includes a piston and cylinder assembly 40 similar to that described with respect to FIG. 2 or 3. However, in this form of the invention, the compensator means 41 comprises a rigid protective housing 42 which is defined by a pair of circular concentric wall portions 42A and 42B, each having opposing connected side walls 42A', 42A' and 42B', 42B' that terminate in an outwardly extending flange 42C. The housing components 42A and 42B are formed of a relatively rigid material. Sandwiched between the housing components 42A, 42B is a flexible impervious diaphragm 44. It is to be noted that the housing 42 defines a toroidal closed chamber which is partitioned by the flexible diaphragm 44 to define a pair of chambers 45, 46 within the housing 42. In accordance with this invention, a compressed gas is confined in one of the housing chambers. The other chamber is in communication with the actuating hydraulic fluid or liquid of the piston and cylinder assembly. In the illustrated embodiment of FIG. 4, chamber 45 contains the compressed gas medium whereas chamber 46 is provided with one or more openings or holes 47 to place chamber 46 in open communication with the cylinder 21. In all other respects, the structure and function of the embodiment of FIG. 4 is similar to that described with respect to the embodiment of FIG. 3.

Figure 5:
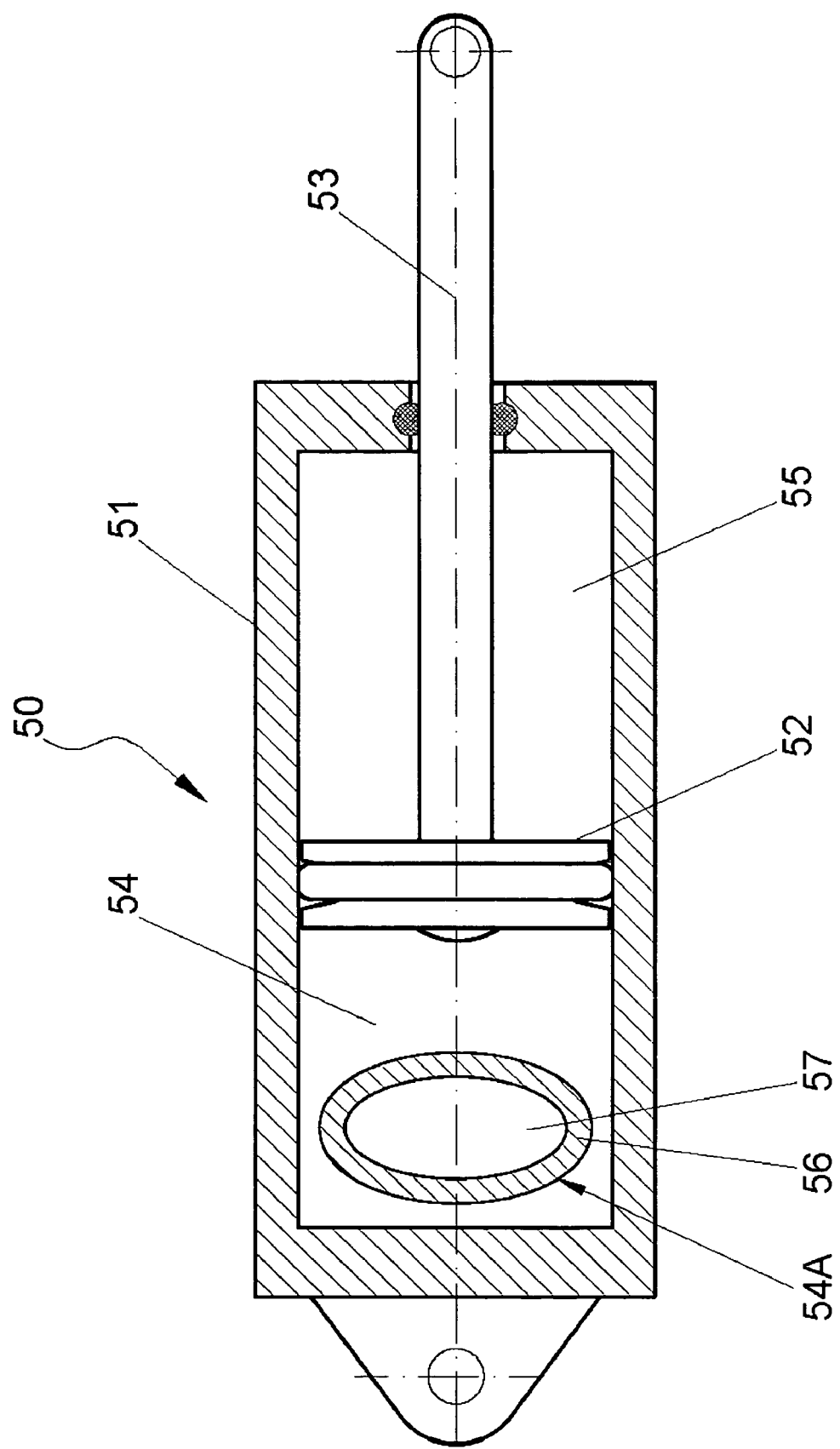
FIG. 5 is a sectional view of a piston and cylinder assembly embodying still another modified form of the invention.

FIG. 5 is directed to a further embodiment of the invention. FIG. 5 illustrates a piston and cylinder assembly 50 which includes a cylinder 51, a piston 52 and a connected piston rod 53 similar in structure to that hereinbefore described. In this form of the invention, the compensating means 54A is disposed in cylinder chamber 54 instead of the chamber 55 through which the piston rod extends, as hereinbefore described. The volume compensating means 54A of FIG. 5 include a capsule 56 formed of an elastic material which is allowed to expand or contract to compensate for any change in the volume of the fluid that is being displaced from one chamber to the other as the piston reciprocates. Confined within the capsule or balloon like structure 56 is a volume of compressed gas 57. In all other respects, the structure of FIG. 5 is similar to that hereinbefore described.

FIG. 6 is directed to another modified form of the invention. The embodiment of FIG. 6 is similar in structure to that described with respect to FIG. 5, except that the capsule 56 is enclosed in a rigid cage or housing 60. As shown, the cage or housing 60 is illustrated as a box sized to encompass therein the capsule 56. As hereinbefore shown, the capsule 56 is filled with a compressed air or gaseous medium. One or more holes 61 are formed in the sides of the housing or cage 60 so that the interior of the housing 60 is disposed in open communication with the cylinder chamber 62 in which the housing is located. In all other respects, the structure and operation of the embodiment of FIG. 6 is similar to that of FIG. 5. In addition, the rigid housing 60 functions to limit the retracted-most position of the piston 52.

From the foregoing description, it will be apparent such piston and cylinder assemblies are often used as dampers or speed control devices. The compensation system herein described limits the compensation effect to that cylinder chamber in which the compensating means is located. As described, the disclosed compensation means may take various forms or shapes which will not materially effect its operation or function. In those embodiments wherein the compensating capsule is confined within a rigid cage or housing, the housing may also function as a means to limit or control the maximum extended or retracted position of the piston rod depending in which chamber of the cylinder the compensation means is located.

While the present invention has been described with respect to various embodiments, it will be understood that variations and modifications thereof may be made without departing from the spirit and scope of this invention.

What is claimed is:

1. A piston and cylinder assembly comprising:
    a cylinder having opposed end walls,
    a piston disposed within said cylinder for reciprocating within said cylinder,
    a piston rod connected to said piston,
    said piston rod having a free end extending through and beyond an end wall of said cylinder, and
    a compensating means disposed within the cylinder between said piston and an end wall of said cylinder,
    said compensating means including a capsule formed of a material capable of expanding and contracting,
    and said capsule defining an enclosed environment for containing a gaseous medium,
    a limiting means disposed on said piston rod,
    said limiting means being located between an end wall of said cylinder and said piston to limit the stroke of said piston rod,
    said capsule is toroidal in shape and circumscribes said piston rod between said piston and said end wall.

2. A piston and cylinder assembly as defined in claim 1 wherein said limiting means includes:
    a housing formed of a rigid material,
    a diaphragm partitioning said housing to a pair of housing chambers,
    a compressed gaseous medium confined within one of said housing chamber,
    and the other of said housing chamber having an opening whereby the interior of said other housing chamber is disposed in open communication with the interior of said cylinder.

3. A piston and cylinder assembly as defined in claim 2 wherein said housing circumscribes said piston rod.

4. A piston and cylinder assembly comprising;
    a cylinder having opposed end walls,
    a piston disposed within said cylinder for reciprocating within said cylinder,
    a piston rod connected to said piston,
    said piston rod having a free end extending through and beyond an end wall of said cylinder, and
    a compensating means disposed within the cylinder between said piston and an end wall of said cylinder,
    said compensating means including a capsule formed of a material capable of expanding and contracting,
    and said capsule defining an enclosed environment for containing a gaseous medium,
    a spring means interposed between said piston and said end wall.

5. A piston and cylinder assembly comprising:
    a cylinder having opposed end walls,
    a piston disposed within said cylinder for reciprocating within said cylinder,
    a piston rod connected to said piston,
    said piston rod having a free end extending through and beyond an end wall of said cylinder, and
    a compensating means disposed within the cylinder between said piston and an end wall of said cylinder,
    said compensating means including a capsule formed of a material capable of expanding and contracting,
    and said capsule defining an enclosed environment for containing a gaseous medium,
    wherein said compensating means includes a rigid housing enclosing said capsule,
    and said housing having an opening whereby the interior of said housing is disposed in communication with the interior of said cylinder.

6. A piston and cylinder assembly as defined in claim 5 wherein said housing circumscribes said piston rod and is located thereon between said piston and said end wall of said cylinder.

7. A piston and cylinder assembly comprising:
    a cylinder having opposed end walls,
    a piston reciprocally disposed within said cylinder,
    said piston defining a pair of opposed cylinder chambers,
    a piston rod connected to said piston,
    said piston rod having free end extending through one of said cylinder chambers and through an opening in an end wall of said cylinder,
    a sealing means circumscribing said piston rod and said opening through which said piston rod extends,
    and a compensating means disposed in the other of said cylinder chambers,
    said compensating means including a capsule formed of a gas impervious material capable of expanding and contracting for compensating for any change of fluid volume within said other cylinder chamber,
    said capsule defining a gas impervious enclosure, and
    a compressed gaseous medium confined with said capsule,
    a rigid housing sized to enclose said capsule within said housing, and
    said housing having an opening disposed in open communication with the operating fluid within the cylinder chamber.

8. A hydraulic piston and cylinder assembly comprising:
    a cylinder having opposed end walls,
    a piston reciprocally disposed within said cylinder,
    sealing means circumscribing said piston forming a sliding seal between said piston and the internal surface of said cylinder,
    said piston defining a pair of opposed cylinder chambers within said cylinder,
    a piston rod connected to said piston,
    said piston rod having a free end extending through one of said pair of cylinder chambers and through an end opening formed in one of said opposed end walls,
    a packing means circumscribing said piston rod and said end opening to form a fluid tight seal thereat,
    and a compensating means disposed in one of said cylinder chambers,
    said compensating means including a capsule capable of expanding and contracting to compensate for any change in volume of the hydraulic fluid in said cylinder,
    said capsule being formed of a gas impervious material, and
    a compressed gas confined within said capsule,
    and including a spring interposed between said piston and said one end wall of said cylinder.

9. A hydraulic piston and cylinder assembly as defined in claim 8 and including:
    limiting means disposed between said piston and one of said end walls to limit the movement of said piston within said cylinder.

10. A hydraulic piston and cylinder assembly as defined in claim 9 wherein said limiting means includes;
    a spacer bushing disposed along said piston rod between said piston and said one end wall of said cylinder.

11. A hydraulic piston and cylinder assembly as defined in claim 9 wherein said limiting means includes:
    a rigid housing having an axial length, said rigid housing having a size and shape capable of containing said capsule therein, said rigid housing being disposed within said cylinder between said piston and an end wall of said cylinder, and said housing having an opening for communicating the interior of said housing with the interior of said cylinder.

* * * * *